Figure 1:
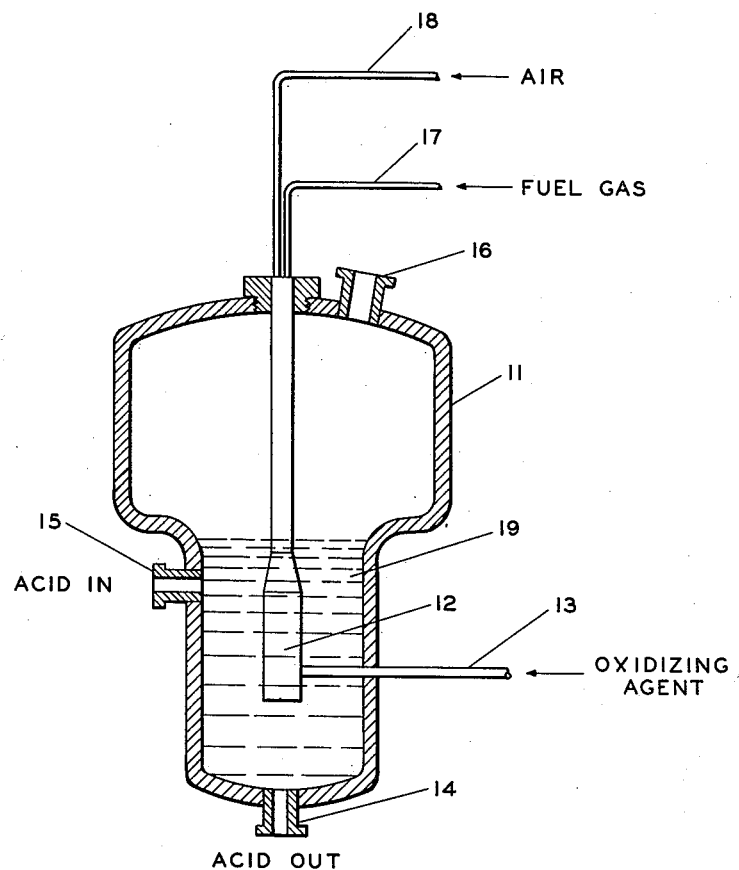

June 30, 1953 S. P. ROBINSON 2,643,938
PURIFICATION OF SPENT SULFURIC ACID
Filed Aug. 18, 1947

INVENTOR.
S. P. ROBINSON
BY Hudson and Young
ATTORNEYS

Patented June 30, 1953

2,643,938

UNITED STATES PATENT OFFICE 2,643,938

PURIFICATION OF SPENT SULFURIC ACID

Sam P. Robinson, Bartlesville, Okla., assignor to Phillips Petroleum Company, a corporation of Delaware Application August 18, 1947, Serial No. 769,258

7 Claims. (Cl. 23—172)

This invention relates to the concentration of sulfuric acid. In one of its more specific aspects it relates to removing organic impurities from sulfuric acid which is being concentrated.

In processes such as alkylation or the manufacture of alcohols by the adsorption of one or more olefins in sulfuric acid, it is usually desirable that the initial acid concentration or strength be relatively high, such as between 85 and 98 per cent by weight, depending upon the olefin adsorbed and the operating economics of acid concentrations. In the manufacture of alcohols the rich acid-olefin ester solution is usually diluted to approximately 35 to 50 per cent sulfuric acid concentration to promote hydrolysis. The hydrolized alcohols are steam stripped off, leaving a residual weak acid containing between about 0.5 and about 8 per cent by weight of carbon in several combined forms such as alcohols, ketones, sulfonic acids, sulfonated organics, tars and resins.

These carbonaceous impurities tend to prevent the reconcentration of the dilute acid to the desired reuse strength. As the strength and boiling point of the acid is raised by the evaporation of water, the organic impurities are increasingly acted upon by the hotter and more anhydrous acid and go successively through a resinous, viscous and tarry stage. This stage generally occurs within a range of from about 65 to 75 per cent by weight concentration of sulfuric acid. A second stage appearing in the reconcentration process is one in which most of the carbon is dehydrated to a coke. This stage usually occurs within the acid concentration of between about 75 and 80 per cent. One of the factors which tends to increase the cost of reconcentrating sulfuric acid is the fact that organic matter present in the acid increasingly accelerates the decomposition of the sulfuric acid into sulfur dioxide, water, and oxygen as the acid concentration rises above about 60 or about 65 per cent concentration. The organic material may be changed to flocculent carbon, which may be removed by skimming, or to carbon monoxide, which escapes as an effluent. As the sulfuric acid concentration increases, acid decomposition and the resulting loss of sulfur dioxide also increases until at a concentration in the vicinity of 85 per cent, the sulfur dioxide losses become tremendous, and the whole mass can be converted into a viscous mass incapable of further concentration.

In view of the above facts, it is apparent that the removal of organic material from the partially concentrated sulfuric acid is imperative. One of the most successful methods used in removing the largest portion of the organic material has been to heat the acid to substantially its boiling point and maintain such temperature until the acid has reached a concentration in the vicinity of between 70 and 80 per cent sulfuric acid. During this heating process, a large portion of the organic material is converted to flocculent carbon. This carbon may be removed from the acid by filtering, or by skimming from the acid surface after a short cooling and settling period, or in any other conventional manner. By the time the coke or carbon formed has been removed from the acid having a concentration as high as approximately 80 per cent by weight it may still contain approximately 1.0 to 1.5 per cent or more organic material or carbon, which material causes excessive sulfur dioxide losses, prevents water evaporation from acid which is much above 90 per cent concentration, and leaves the acid a dark and dirty color and not as well suited to use as a cleaner acid. The step of removing the 1.0 to 1.5 per cent organic material from the more highly partially concentrated sulfuric acid has presented many difficulties to the industry. One method heretofore used for removing the remaining organic material has been that of utilizing a bleaching agent such as nitric acid at temperatures up to approximately 400°.

It is an object of this invention to provide a method whereby organic material may be removed from sulfuric acid more economically and efficiently.

Another object of the invention is to provide an improved method for removing organic materials from partially concentrated sulfuric acid by oxidation at relatively high temperatures with the least possible decomposition of such acid.

Other objects and advantages will be apparent to those skilled in the art from the accompanying description.

By this invention organic material in partially concentrated sulfuric acid is removed by high temperature oxidation. The acid concentrated by the process of this invention may be the dilute, partially concentrated acid immediately resulting from use of the acid or it may be acid which has been further partially concentrated by heating and removing flocculated carbon and water vapor. In the operation of the invention suitable combustible materials are fed to a partially submerged burner within partially concentrated sulfuric acid contained in an acid resistant vessel. The temperature of the flame of such burner can be adjusted to reach as high as 3000° F. or higher. By continuously withdrawing acid, which has been further partially concentrated, from the vicinity of the outlet end of the submerged burner within the vessel and continuously adding additional lesser partially concentrated acids to the vessel, the overall temperature of the acid within the vessel will be relatively low. However, at the outlet end of the submerged burner, exceedingly good heat exchange will take place and a small portion of the said acid will reach a high temperature but will immediately be quenched by the cooler acid. In order to get the most efficient oxidation of the organic materials contained within the acid, a stream of an oxidizing gas, such as sulfur trioxide, nitric acid, nitrogen oxides or any other oxidizing agent which is an efficient oxidizing agent at temperatures between approximately about 1100° F. and about 3000° F., is injected into the submerged burner which forms the combustion zone. Extremely hot oxidizing gases, with or without nascent oxygen, flash-oxidize impurities in acid around the burner outlet far more completely and efficiently than is possible by adding liquid oxidizing agents such as HNO₃ to boiling acid. The oxidizing gas may be injected in the burner in admixture with the combustible materials or may be injected into the burner downstream of the combustion within the combustion zone. In either case the oxidizing gas, heated to a high temperature and in admixture with the combustion gases, is passed from the combustion zone into a vessel containing the partially concentrated sulfuric acid, which vessel constitutes a purifying zone. At temperatures above 1100° F. sulfur trioxide tends to decompose forming sulfur dioxide and nascent oxygen. It will therefore be seen that at temperatures between 1100° and 3000° F. a ready supply of nascent oxygen is available for the oxidation of the organic materials. Between these temperatures and above, the organic materials and the nascent oxygen are caused to combine to form volatile oxides of carbon which are removed from the acid and the purifying zone. The further partially concentrated acid, i. e., that from which the organic materials have been removed in such a manner, is removed from the purifying zone and if further concentration is desired it is passed to a vacuum concentrator. Additional amounts of weaker partially concentrated acid are added to the vessel to replace the further partially concentrated acid removed.

Figure 1 of the drawing is a vertical section view of a device capable of carrying out the method of this invention.

Figure 2:
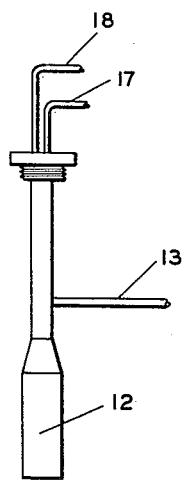

Figure 2 is a vertical elevation of a submerged burner showing an alternate point for the introduction of oxidizing agent thereinto.

In Figure 1 of the drawing vessel 11 may be made of any suitable acid resistant material. The vessel, while preferably being closed, may be of any desired shape. Provision should be made for a sufficient amount of space in the upper portion of the vessel in which to collect vapors. Extending through the closed upper portion of the vessel is a heating means such as conventional submerged burner 12, which is constructed of any suitable acid resistant, heat resistant material. Communicating with submerged burner 12 at a point downstream of the combustion point is a heat resistant, acid resistant conduit 13 which extends through the wall of vessel 11 and conveys oxidizing agent to the submerged burner or combustion zone. Vessel 11 is provided in its bottom, at a point relatively close to the outlet end of submerged burner 12, with acid outlet 14. Also provided in vessel 11, preferably at a point above the level of the outlet end of the submerged burner is acid inlet 15. Vapor outlet 16 is provided, in the upper portion of vessel 11, for the purpose of allowing gaseous products to escape from the vessel. Fuel inlet 17 is provided to convey combustion fuel to submerged burner 12 and air inlet 18 is provided to furnish air for the combustion within the submerged burner. Partially concentrated sulfuric acid 19 is maintained in the lower portion of vessel 11 and surrounds at least the outlet end of submerged burner 12. In the device of Figure 2 the oxidizing agent is injected into the submerged burner at a point upstream from the combustion point.

This invention has many advantages. One such advantage is that by carrying on a high temperature oxidation reaction in this manner, that decomposition of the sulfuric acid due to high temperature is substantially retarded or prevented. A second advantage is that by using sulfur trioxide as the oxidizing agent, the decomposition of the sulfuric acid is substantially reduced because of an excess of sulfur dioxide within the purifying zone, resulting from the decomposition of the sulfur trioxide. This excess of sulfur dioxide tends to discourage the decomposition of the sulfuric acid into sulfur dioxide and its other components. A further advantage in using sulfur trioxide as the oxidizing agent is that the sulfur dioxide resulting from the oxidizing agent and any decomposed sulfuric acid can be collected, oxidized, and reused as an oxidizing agent. Other oxidizing agents such as nitric acid may be used in a manner similar to that in which the sulfur trioxide is used. Use of nitric acid as the oxidizing agent has the disadvantage, however, of a greater loss of oxidizing agent resulting from the reaction. Oxides of nitrogen resulting from the decomposition of the oxidizing agent would become mixed with sulfur dioxide resulting from the decomposition of the sulfuric acid. It would then be necessary to separate the two before reoxidizing the oxides of nitrogen. It is therefore economically advantageous to use sulfur trioxide as the oxidizing agent.

Advantages of this invention are illustrated by the following example. The reactants, and their proportions, and other specific ingredients are presented as being typical and should not be construed to limit the invention unduly.

*Example*

Sulfuric acid which has a concentration of about 75% to 80% by weight is passed into an acid resistant container at a temperature of about 295° F. in which is positioned a conventional submerged burner. Combustible materials are supplied to the submerged burner which is adjusted to burn the materials at a temperature of about 3000° F. Sulfur trioxide is injected into the burner at a point near its outlet and, in admixture with the highly heated combustion gases from the burner, is passed into the sulfuric acid. The sulfur trioxide is partially decomposed at the high temperature and the nascent oxygen resulting from the decomposition combines with the organic materials to oxidize them at the high temperature. However, the main bulk of the acid undergoing treatment remains at a temperature below its boiling and decomposition temperature. Oxidized materials are volatilized and are removed from the acid. The purified acid from the vicinity of the burner is removed from the vessel and passed to a vacuum concentrator and additional acid of 75% to 80% concentration is added to the vessel.

As will be evident to those skilled in the art, various modifications of this invention can be made, or followed, in the light of the foregoing disclosure and discussion, without departing from the spirit or scope of the disclosure or from the scope of the claims.

I claim:

1. An improved process for partially concentrating a sulfuric acid containing organic material, which comprises the steps of admixing hot combustion gases and an oxidizing agent at a temperature within the range of 1100° F. to 3000° F. so as to decompose said oxidizing agent to liberate nascent oxygen; immediately introducing said resulting admixture into said sulfuric acid, whereby organic material is oxidized by reaction with said nascent oxygen and a portion of the water content of said acid is vaporized; and removing said oxidized material and said water vapor from said acid.

2. The process of claim 1, wherein the oxidizing agent is sulfur trioxide.

3. An improved process for further partially concentrating a first partially concentrated sulfuric acid containing organic material, which comprises the steps of introducing an oxidizing agent into a combustion zone; introducing combustible materials into said combustion zone; burning said combustible materials in the presence of said oxidizing agent and at a temperature in the range of 1100° F. to 3000° F. and decomposing said oxidizing agent to liberate nascent oxygen; immediately passing the admixture of the resulting combustion gases and products of said oxidizing agent from said combustion zone into a purifying zone containing said first partially concentrated sulfuric acid and which acid surrounds at least the outlet end of said combustion zone, whereby organic material is oxidized by reaction with said nascent oxygen and a portion of the water content of said acid is vaporized; removing said oxidized organic material and water vapors from said purifying zone; withdrawing said further partially concentrated acid from said purifying zone; and adding additional first partially concentrated acid to said purifying zone.

4. In a process for concentrating sulfuric acid wherein partially concentrated acid containing organic material is further partially concentrated by heating said acid to remove a portion of its water content and to decompose said organic materials to flocculate carbon resulting from said organic materials, and removing said flocculated carbon from said acid, the improvement in still further concentrating said acid comprising the steps of admixing hot combustion gases and an oxidizing agent at a temperature in the range of 1100° F. to 3000° F. so as to decompose said oxidizing agent and liberate nascent oxygen, within a combustion zone; immediately passing said combustion gas and materials resulting from the decomposition of said oxidizing agent from said combustion zone into a purifying zone which contains said partially concentrated sulfuric acid and which acid surrounds at least the outlet end of said combustion zone, whereby a portion of said organic matter is oxidized by reaction with said nascent oxygen; removing said oxidized material from said purifying zone; and adding additional lesser concentrated acid to said purifying zone.

5. An improved process for further partially concentrating a first partially concentrated sulfuric acid containing organic material, which comprises in combination the steps of admixing combustible gases and an oxidizing agent capable of oxidizing at high temperatures, within a combustion zone; burning the combustible gases of said admixture in said combustion zone at a temperature in the range of 1100° F. to 3000° F. and decomposing said oxidizing agent to liberate nascent oxygen; immediately passing resulting combustion gas and materials resulting from the decomposition of said oxidizing agent from said combustion zone into a purifying zone which contains said first partially concentrated sulfuric acid and which acid surrounds at least the outlet end of said combustion zone, whereby organic matter is oxidized by reaction with said nascent oxygen and a portion of the water content of said acid is vaporized; removing said oxidized organic matter and water vapors from said purifying zone; withdrawing said further partially concentrated acid from said purifying zone; and adding additional first partially concentrated acid to said purifying zone.

6. An improved process for further partially concentrating a first partially concentrated sulfuric acid containing organic material, which comprises in combination the steps of admixing hot combustion gases and an oxidizing agent, capable of releasing nascent oxygen upon decomposition at temperatures within the temperature range of 1100° F. to 3000° F., within a combustion zone; passing said combustion gas and materials resulting from the decomposition of said oxidizing agent from said combustion zone, at a temperature within the range of about 1100° F. to about 3000° F., into a purifying zone which contains said first partially concentrated sulfuric acid and which acid surrounds at least the outlet end of said combustion zone, whereby organic matter is oxidized by reaction with said nascent oxygen and a portion of the water content of said acid is vaporized; removing said oxidized organic matter and water vapors from said purifying zone; withdrawing said further partially concentrated acid from said purifying zone; and adding additional first partially concentrated acid to said purifying zone.

7. An improved process for partially concentrating a sulfuric acid containing organic material, which comprises the steps of admixing combustion gases and sulfur trioxide at approximately the combustion temperature in a mixing zone thereby decomposing sulfur trioxide to form sulfur dioxide and nascent oxygen; introducing said admixture into said sulfuric acid in a purifying zone, whereby organic material is oxidized by reaction with said nascent oxygen and a portion of the water content of said acid is vaporized; removing said oxidized material and said water vapor from said acid; collecting sulfur dioxide resulting from said oxidation; oxidizing said sulfur dioxide to form sulfur trioxide; and passing said sulfur trioxide to said mixing zone.

SAM P. ROBINSON.

References Cited in the file of this patent

UNITED STATES PATENTS

| Number | Name | Date |
|---|---|---|
| 59,531 | Barrett | Nov. 6, 1866 |
| 2,249,192 | Titlestad | July 15, 1941 |
| 2,302,825 | Wilde | Nov. 24, 1942 |
| 2,373,359 | Voogd | Apr. 10, 1945 |

FOREIGN PATENTS

| Number | Country | Date |
|---|---|---|
| 1,394 | Great Britain | Nov. 11, 1870 |
| 242,681 | Great Britain | Nov. 12, 1925 |